United States Patent Office 2,957,872
Patented Oct. 25, 1960

2,957,872
PHTHALIMIDINES AND PROCESS FOR MANUFACTURING SAME

Charles Ferdinand Huebner, Chatham, N.J., assignor to Ciba Pharmaceutical Products Inc., Summit, N.J., a corporation of New Jersey No Drawing. Filed Oct. 21, 1957, Ser. No. 691,136

20 Claims. (Cl. 260—247.2)

This invention relates to a new series of phthalimidines, salts or quaternary ammonium compounds. The new phthalimidine derivatives are substituted in the 2-position by a hydrocarbon radical containing an amino group and in 3-position by an aromatic radical. The invention particularly concerns 2-tertiary aminoalkyl-3-R-phthalimidines, in which R represents an aryl or an aralkyl group, the salts and quaternary compounds thereof, as well as process for the preparation of the new 2-tertiary aminoalkyl-3-R-phthalimidines.

The tertiary aminoalkyl radical attached to the nitrogen atom of the 2-position of the phthalimidine portion is more especially a tertiary amino-lower alkyl group, the lower alkyl radical of which contains from 2 to 7 carbon atoms and may be represented by a lower alkylene radical, such as, for example, 1,2-ethylene, 1,3-propylene, 1,2-propylene, 1,4-butylene, 1,3-butylene, 1,2-butylene, 2,3-butylene, 1,2-isobutylene, 1,5-pentylene or 1,4-pentylene. Tertiary amino groups are particularly N,N-di-lower hydrocarbon-amino or N,N-lower alkylene-imino groups. The lower hydrocarbon radicals of N,N-di-lower hydrocarbon amino groups are, for example, lower alkyl, lower alkenyl, lower cycloalkyl, aryl or aralkyl radicals containing from 1 to 7 carbon atoms, e.g. methyl, ethyl, propyl, isopropyl, butyl, isobutyl, pentyl, neopentyl, allyl, methallyl, cyclopentyl, cyclohexyl, phenyl or benzyl. Therefore, N,N-di-lower hydrocarbon-amino groups are, for example, dimethylamino, diethylamino, dipropyl-amino, N-methyl-N-cyclopentyl-amino or N-methyl-N-benzylamino groups. The lower alkylene radicals of N,N-lower alkylene-imino groups contain from 4 to 6 carbon atoms which may be arranged in a carbon chain or such chain may be interrupted by a hetero atom such as nitrogen, sulfur or oxygen, thus form an aza, thia- or oxalkylene radical; together with the nitrogen atom such lower alkylene radicals represent, for example, a pyrrolidino radical e.g. pyrrolidino or 2-methyl-pyrrolidino; a piperidino radical e.g. piperidino, 2-, 3- or 4-methyl-piperidino, 3-hydroxy- or 3-acetoxy-piperidino; hexamethyleneimino; morpholino; thiamorpholino; or a piperazino radical, e.g. $N^4$-methyl-, $N^4$-hydroxyethyl- or $N^4$-acetoxyethyl-piperazino.

The substituent R in the 3-position of the phthalimidine molecule when standing for an aryl or an aralkyl radical, represents particularly a monocyclic aryl or aralkyl radical, e.g. a phenyl or benzyl radical, but may also stand for a 1- or 2-naphthylmethyl radical, or, generally, for aryl-lower alkyl, e.g. phenyl-lower alkyl, radicals. The alkyl radical in the aralkyl residue is primarily represented by a lower alkylene radical having from 1 to 3 carbon atoms and is, for example, a 1,2-ethylene, a 1,3- or 1,2-propylene and especially a methylene radical. Such radicals may also contain lower alkyl groups e.g. methyl or ethyl, as additional substituents; therefore such lower alkylene radicals may also be represented by 1,1-ethylene or 2,2-propylene radicals. The aromatic portion of a substituent R may be unsubstituted or contain at least one substituent such as, for example, a lower alkyl radical e.g. methyl or ethyl; a halogen atom, e.g. chlorine or bromine; hydroxyl; a lower alkoxy group, e.g. methoxy or ethoxy; or an amino group e.g. amino or dimethylamino.

The aromatic portion of the phthalimidine nucleus may be unsubstituted or may contain at least one substituent in any of the four positions available for substitution. Such substituents are, for example, lower alkyl radicals e.g. methyl or ethyl; halogen atoms, e.g. chlorine or bromine; lower alkoxy radicals, e.g. methoxy or ethoxy; or amino groups, e.g. amino or dimethylamino.

Salts of the compounds of this invention are particularly therapeutically useful acid addition salts such as those with inorganic or organic acids, for example, hydrohalic acids, e.g. hydrochloric or hydrobromic acid; nitric or thiocyanic acid; sulfuric or phosphoric acids, acetic, propionic, glycolic, lactic, pyruvic, oxalic, malonic, succinic, maleic, fumaric, malic, tartaric, citric, benzoic, cinnamic, salicylic, 2-phenoxy- or 2-acetoxy-benzoic acid, mandelic, methane sulfonic, ethane sulfonic, hydroxyethane sulfonic, benzene or toluene sulfonic acid or methionine, tryptophane, lysine or arginine.

Quaternary ammonium compounds of the 2-tertiary aminoalkyl-3-R-phthalimidines may be mono- or bis-quaternary ammonium compounds and are particularly lower alkohalides, e.g. methiodides, methobromides, methochlorides, ethobromides or propylchlorides; lower alkenyl halides, e.g. allylbromides; or lower alkyl sulfates, e.g. dimethyl or diethyl sulfate; or the corresponding hydroxides. Depending on the conditions of formation and the number of salt or quaternary ammonium derivative forming groups mono- or bis-salts or mono- or bis-quaternary ammonium derivatives may be obtained.

Due to the presence of at least one asymmetric carbon atom the 2-tertiary amino-alkyl-3-R-phthalimidines, their salts and quaternary ammonium compounds may exist in the form of the racemic d,l-mixture or as the optically active d- and l-forms obtainable from the racemic mixture.

The new compounds of this invention show analgesic properties and can be used as analgesic agents for the alleviation of pain. Especially suitable as analgesic agents are 2-(N,N-di-lower alkyl-amino-lower alkyl)-3-R-phthalimidines, in which R stands for a benzyl radical, such radical being unsubstituted or substituted as outlined before, and the therapeutically useful acid addition salts thereof. These compounds may be represented, for example, by the phthalimidine of the formula:

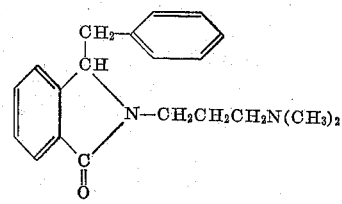

and the acid addition salts with hydrohalic acids, e.g. hydrochloric acid.

The new compounds of this invention may be used as medicaments in the form of pharmaceutical preparations, which contain the new phthalimidine derivatives, the salts or the quaternary ammonium componnds thereof in admixture wtih a pharmaceutical organic or inorganic solid or liquid carrier suitable for enteral of parenteral administration. For making up the preparations there can be employed substances which do not react with the new compounds, such as water, gelatine, lactose, starches, magnesium stearate, talc, vegetable oils, benzyl alcohols, gums, polyalkylene glycols or any other known carrier for medicaments. The pharmaceutical preparations may be, for example, in the form of tablets or dragees, or in liquid form as solutions, suspensions or emulsions. If desired, they may contain auxiliary substances, such as preserving agents, stablizing agents, wetting or emulsifying agents, salts for varying the osmotic pressure or buffers. They may also contain, in combination, other therapeutically useful substances.

Moreover, the 2-tertiary aminoalkyl-3-R-phthalimidines of this invention can be used as intermediates in the preparation of 1-R-2-tertiary aminoalkyl-isoindolines, their salts and quaternary ammonium compounds. These isoindolines are described in my copending applications Serial No. 632,027, filed on January 2, 1957 (now abandoned), and Serial No. 691,170, filed on even date herewith and exhibit antihistaminic, tranquilizing and anti-inflammatory effects and are intended to be used in the treatment of allergic disorders, in states of overactiveness, anxiety, stress and shock, and in edema producing infections. The conversion of the 2-tertiary aminoalkyl-3-R-phthalimidines of thsi invention to the corresponding isoindolines may be carried out by treating the phthalinidine derivatives or salts thereof, with a reducing agent capable of reducing the carbonyl group of an amide to a methylene radical. Reducing agents suitable for this reaction are more especially di-light metal hydrides, such as lithium aluminum hydride, sodium aluminum hydride or magnesium aluminum hydride, which may also be used in the presence of a catalyst such as aluminum chloride. The reduction may also be brought about by catalytic hydrogenation, such as wtih hydrogen in the presence of a copper barium chromite catalyst, or by electrolytic reduction.

Although several methods for the preparation of the compounds of this invention may be envisaged, I prefer to prepare the 2-tertiary aminoalkyl-3-R-phthalimidines, salts and quaternary ammonium compounds thereof, in which R has the meaning given above, by reacting a 3-R-phthalide with a tertiary aminoalkylamine or a salt thereof, and, if desired, converting any resulting salt into the free base, and/or, if desired, converting any free base into a salt or a quaternary ammonium compound. The 2-tertiary aminoalkyl-3-R-phthalimidines, in which R represents an aralkyl radical, may also be obtained by treating a phthalide, which contains in the 3-position an aralkylidene radical, wtih a tertiary aminoalkylamine or a salt thereof and reducing in a resulting 2-tertiary aminoalkyl-phthalimidine or a salt thereof the aralkylidene group in the 3-position to an aralkyl group, i.e. the carbon-carbon double bond extending from the 3-position of the phthalimidine portion to a carbon-carbon single bond. Any additional aliphatic carbon-carbon double bond in the aralkylidene radical may be reduced simultaneously. An aralkylidene radical is represented, for example, by benzal, 1-phenyl-ethylidene or 3-phenyl-propene-(2)-ylidene, the aromatic nuclei of which may be unsubstituted or substituted as described hereinbefore. A salt of a tertiary aminoalkylamine is an acid addition salt, more especially a salt with a strong organic acid e.g. hydrochlorci or sulfuric acid.

The reaction may be performed in the absence or presence of a solvent, at room temperature or at an elevated temperature, at atmospheric pressure or at an elevated pressure and, if necessary, in the presence of an inert gas, such as nitrogen. A 3-R-phthalide may be reacted wtih a tertiary aminoalkylamine, particularly an excess thereof, in the absence of a dehydrating reagent to form directly the desired 2-tertiary aminoalkyl-3-R-phthalimidine. On the other hand, a phthalide, containing an aralkylidene radical in the 3-position, may be reacted with a tertiary aminoalkylamine in the presence of an acid, for example, an alkanoic acid, e.g. acetic acid or propionic acid. However, in the absence of either an excess of the amine or an acidic reagent, a phthalide ring may be split open to form a 2-R-carbonyl-benzoic acid N-tertiary aminoalkyl-amide. If in such an amide R stands for an aralky radical, said amide yields upon treatment wtih an acidic reagent e.g. acetic acid, a 2-tertiary aminoalkyl-phthalimidine, containing an aralkylidene radical in the 3-position, which upon reduction may be converted into the desired 2-tertiary aminoalkyl-phthalimidine substituted in 3-position by an aralkyl radical.

Included within the present application is therefore also the process for the preparation of the new phthalimidines which comprises ring closure of a 2-R-carbonyl-benzoic acid N-tertiary aminoalkyl-amide, in which R stands for an aralkyl radical, to the 2-tertiary aminoalkyl-phthalimidines containing an aralkylidene radical in the 3-position, in the presence of an acidic catalyst, and its subsequent reduction to the corresponding phthalimidine, substituted in the 3-position by an aralkyl radical.

Any 2-tertiary aminoalkyl-3-aralkylidene-phthalimidine may subsequently be treated with a reducing agent to form the desired 2-tertiary aminoalkyl-3-aralkyl-phthalimidine. The reduction of such phthalimidines may be carried out by treatment with hydrogen in the presence of a catalyst containing a metal of the eighth group of the periodic system, such as a nickel catalyst, e.g. Raney nickel; a platinum catalyst, e.g. platinum oxide; a palladium catalyst, e.g. palladium on charcoal; or a rhodium catalyst, e.g. rhodium on aluminum oxide. The reduction step is preferably carried out in the presence of a solvent, especially in the presence of an alkanol, e.g. methanol or ethanol, or of a lower alkanoic acid, e.g. glacial acetic acid.

Intended to be included with the scope of the present invention are the new intermediates formed in the process for the preparation of the new 2-tertiary aminoalkyl-3-R-phthalimidines.

Primarily such intermediates are the 2-tertiary aminoalkyl-3-aralkylidene-phthalimidines, in which the tertiary aminoalkyl group is defined as previously described and the aralkylidene radical stands primarily for a benzal, or also for a 1-phenyl-ethylidene or a 3-phenyl-propane-(2)-ylidene radical, the aromatic nuclei of which are unsubstituted or substituted as described before. As already described these 2-tertiary aminoalkyl-3-aralkylidene-phthalimidines may be converted into the corresponding 3-aralkyl-phthalimidines by reduction, preferably by treatment with catalytically activated hydrogen, and may be prepared by treating a 3-aralkylidene-phthalide with a tertiary aminoalkylamine in the presence of an acidic agent, e.g. acetic acid.

Secondly, the 2-R-carbonyl-benzoic acid N-tertiary aminoalkyl-amides, in which R stands for aryl or aralkyl, and which are formed as intermediates in the condensation of a phthalide, which contains an aryl, an aralkyl or an aralkylidene radical in the 3-position, with a tertiary aminoalykylamine or a salt thereof, may be isolated by working under neutral conditions and/or without an excess of the amine. As already pointed out, treatment of such a benzoic acid amide containing an aralkyl radical in the 3-position, with an acidic reagent, such as acetic acid, yields the 2-tertiary aminoalkyl-3-aralkylidene-phthalimidines. Or, upon treatment of such a benzoic acid amide, containing an aryl- or an aralkyl-carbonyl radical in the 2-position, with a reagent capable of reducing the carbonyl of an amide group, such as, for example, lithium aluminum hydride, 1-R-2-tertiary amino-isoindolines, such as those mentioned hereinbefore, may be produced.

Substituents attached to one of the aromatic nuclei may be converted into other substituents either simultaneously with the formation of the phthalimidine derivative or subsequently thereto. For example, a nitro group may be reduced to an amino group under the reduction conditions used for the conversion of a 3-aralkylidene-phthalimidine to a 3-aralkyl-phthalimidine; or, a free hydroxyl group may be converted into a lower alkoxy, e.g. methoxy, or into an acyloxy e.g. acetoxy, group.

Depending on the conditions used, the compounds described hereinbefore may be obtained in the form of the free bases or the salts thereof. The salts may be converted into the free bases, for example, by reaction with a basic reagent, e.g. sodium or potassium hydroxide or aqueous ammonia. The free base may be transformed into acid addition salts by reaction with one of the inorganic or organic acids outlined hereinbefore, for example, by treating an alkanol, e.g. methanol or ethanolic, or an ether e.g. diethylether solution of the free base with one of the acids, or a solution of the acid in a solvent, e.g. ethanol or ether.

The quaternary ammonium compounds of the compounds described hereinbefore may be obtained, for example, by reacting the tertiary bases with an ester formed by a hydroxylated lower hydrocarbon compound with a strong inorganic or organic acid. Hydroxylated lower hydrocarbon compounds contain from 1 to 7 carbon atoms and the esters thereof are more especially those with mineral acids, e.g. hydrochloric, hydrobromic, hydriodic or sulfuric acid. Such esters are specifically lower alkyl halides, e.g. methyliodide, methylbromide, methylchloride, ethylbromide or propylchloride; lower alkenyl halides, e.g. allyl bromide; di-lower alkyl-sulfates, e.g. dimethyl or diethyl sulfate; or lower alkyl arylsulfonates, e.g. methyl p-toluolsulfonate. The quaternizing reactions, such as outlined above, are performed in the presence or absence of a solvent, at room temperature or under cooling, at atmospheric pressure or in a closed vessel under pressure. Suitable solvents are more especially alkanols, e.g. methanol, ethanol, propanol, isopropanol or amyl alcohol; or organic acid amides, e.g. formamide or dimethylformamide. When lower alkyl halides are used as quaternizing agents, formamide and dimethylformamide are the preferred solvents and the reaction may advantageously be run in a closed vessel under pressure, the latter being built up by heating.

Quaternary ammonium compounds obtained may be converted into the corresponding quaternary ammonium hydroxides, for example, by reaction of the quaternary ammonium halides obtained with silver oxide, or by reaction of the sulfates with barium hydroxide or by treating the quaternary salts with an anion exchanger or by electrodialysis. From any resulting base there may be prepared therapeutically suitable quaternary ammonium salts by reaction with acids, for example, those outlined hereinbefore for the preparation of the salts; or with mono-lower alkyl sulfates such as methyl or ethyl sulfate. A quaternary ammonium compound obtained may also be converted directly into another quaternary salt without conversion into the quaternary hydroxide; for example, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

Ordinarily the phthalimidines of this invention are obtained in the form of their racemates which may be resolved into the optically active d- and l-forms according to procedures known for the resolution of racemic compounds. For example, the free base of a racemic d,l-2-tertiary amino-3-R-phthalimidine may be dissolved in a lower alkanol e.g. methanol or ethanol, and one of the optically active forms of an acid or a solution thereof, for example, in the same alkanol or in water or in a mixture of such solvents, is added, whereupon a salt precipitates which is formed by the optically active acid with the optically active form of the base having the same direction of optical rotation. From this salt, the free and optically active base may be obtained according to processes known for the conversion of a salt into a base as outlined hereinbefore. Such a base can then be converted into a therapeutically useful acid addition salt with one of the acids mentioned hereinbefore. Especially useful as optically active forms of the salt forming acids are D- and L-tartaric acid; also employed are the optically active forms of malic, mandelic, camphor sulfonic or quinic acid. The optically active forms may also be obtained by biochemical methods.

The phthalides, which contain in 3-position an aryl, an aralkyl or an aralkylidene radical, and which are used as starting materials in the above reaction, are known or may be prepared according to methods analogous to those described in the prior art for known phthalides. The following examples serve to illustrate different methods to produce the phthalides used as starting materials: Upon treatment of a 2-benzoyl-benzoic acid with zinc in the presence of an acid, such as acetic acid, a 3-phenyl-phthalide is formed; or, treatment of a phthalic acid anhydride with a phenylacetic acid in the presence of an alkali metal salt of an organic acid, e.g. sodium or potassium acetate, gives rise to the formation of a 3-benzal-phthalide, which may be reduced to a 3-benzyl-phthalide.

The invention also comprises any modification of the process wherein a compound obtainable as an intermediate at any stage of the process is used as starting material and the remaining step(s) of the process is (are) carried out, as well as any new intermediates. Thus, the 2-R-carbonyl-N-tertiary aminoalkyl-benzoic acid amides, R having the above-given meaning, which may be obtained as intermediates in the reaction of a phthalide with a tertiary aminoalkylamine, may also be prepared, for example, by treating a 2-R-carbonyl-benzoic acid halide, e.g. chloride, with a tertiary aminoalkylamine in the presence of an acid binding agent, e.g. potassium carbonate. The benzoic acid amide thus formed may then be converted either into the 2-tertiary aminoalkyl-phthalimidine, containing in 3-position an aralkyl radical, or into the 1-R-2-tertiary aminoalkylisoindolines in which R has the above-given meaning, according to methods already described hereinbefore.

In the process of this invention such starting materials are preferably used which lead to final products mentioned in the beginning as preferred embodiments of the invention.

This is a continuation-in-part application of my copending application Serial No. 632,028, filed January 2, 1957, now abandoned.

The following examples are intended to illustrate the invention and are not to be construed as limitations thereon. Temperatures are given in degrees centigrade.

*Example 1*

A mixture of 20 g. of 3-benzal-phthalide and 12 g. of N,N-dimethyl-ethylenediamine (1.5 molar equivalents) in 200 ml. of acetic acid is refluxed for three hours. The excess acetic acid is distilled off, the residue diluted with water, made basic with ammonia and extracted with ether. The ether is dried over sodium sulfate and distilled off. The resulting 2-(2-dimethylaminoethyl)-3-benzal-phthalimidine is crystallized as the hydrochloride by treatment with ethanolic hydrogen chloride, M.P. 225–226°

20 g. of the crude base is dissolved in 100 ml. of acetic acid and after the addition of 0.2 g. of platinum oxide are hydrogenated at 50 p.s.i. The hydrogenation is completed in 30 minutes. The solution is filtered, the acetic acid distilled off and to the residue is added aqueous ammonia. The basified solution is extracted with ether, the ether distilled off to leave the syrupy 2-(2-dimethylaminoethyl)-3-benzyl-phthalimidine of the formula:

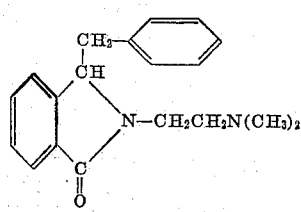

The hydrochloride, prepared by treatment with an alcoholic solution of hydrogen chloride, melts at 200°.

The 2-(2-dimethylaminoethyl)-3-benzyl-phthalimidine may be converted into the corresponding 1-benzyl-2-(2-dimethylaminoethyl)-isoindoline, described in my copending applications Serial No. 632,027, filed January 2, 1957 and Serial No. 691,170, filed October 21, 1957, as follows: A solution of 9 g. of 2-(2-dimethylaminoethyl)-3-benzyl-phthalimidine in 50 ml. of dry ether is added with cooling to a solution of 3 g. of lithium aluminum hydride in 100 ml. of ether. After addition the mixture is refluxed gently, cooled and the excess lithium aluminum hydride destroyed by the addition of ethyl acetate. In order is next added with stirring 4 ml. water, 8 ml. of 15 percent aqueous hydroxide and 16 ml. of water. This serves to decompose the organic lithium aluminum salts in such a manner as to convert the inorganic salt mixture to a granular form which easily filters. Distillation of the ether leaves 1-benzyl-2-(2-dimethylaminoethyl)-isoindoline as a syrup. The dihydrochloride is prepared by treatment with ethanolic hydrogen chloride; after recrystallization from 95 percent ethanol it melts at 200–201°.

Example 2

20 g. of 3-benzal-phthalide is refluxed with 14 g. of N,N-dimethyl-1,3-propylenediamine in acetic acid according to the method described in Example 1. The thus-obtained 2-(3-dimethylaminopropyl) - 3 - benzal-phthalimidine, the hydrochloride of which melts at 225°, is then treated with hydrogen in the presence of platinum oxide as described in Example 1 and 2-(3-dimethylaminopropyl)-1-benzyl-phthalimidine is isolated as the hydrochloride, M.P. 180–181°.

A solution of the 2-(3-dimethylaminopropyl)-3-benzyl-phthalimidine in dimethylformamide is treated with an excess of methyliodide and the methiodide of the formula:

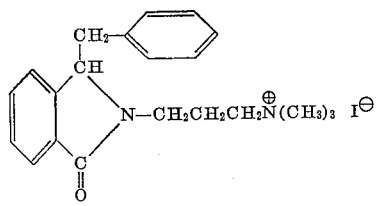

is isolated in crystalline form.

Example 3

20 g. of 3-(4-chlorobenzal)-phthalide and 10.5 g. of N,N-dimethyl-ethylenediamine in 100 ml. of acetic acid are reacted as described in Example 1. The thus-obtained 2 - (2 - dimethylaminoethyl)-3-(4-chloro-benzal)-phthalimidine, the hydrochloride of which melts at 254°, is then reacted with hydrogen in the presence of platinum oxide according to the method given in Example 1. The 2-(2-dimethylaminoethyl) - 3 - (4-chlorobenzyl)-phthalimidine is isolated as the hydrochloride, M.P. 235°.

Example 4

10 g. of 3-benzal-4,5,6,7-tetrachloro-phthalide is added with stirring and cooling to 20 ml. of N,N-dimethyl-ethylenediamine. The homogeneous mixture is dissolved in 100 ml. of chloroform and the chloroform solution washed with water five times to remove the excess of the diamine. The chloroform is distilled off and the residue heated with 40 ml. of acetic acid anhydride for two hours. Excess acetic acid anhydride is distilled under reduced pressure and the residual anhydride decomposed with ice-water. The mixture is basified with ammonia and extracted with ether. Removal of the ether leaves a residue which recrystallizes from ethanol; the thus-obtained 2-(2-dimethylaminoethyl)-3-benzal-4,5,6,7-tetrachloro-phthalimidine melts at 45°.

The 2 - (2 - dimethylaminoethyl)-3-benzal-4,5,6,7-tetrachloro-phthalimidine is hydrogenated as described in Example 1 to yield the 2-(2-dimethylaminoethyl)-3-benzyl-4,5,6,7-tetrachloro-phthalimidine, which after recrystallization from a mixture of ethanol and water melts at 170–171°.

Example 5

A mixture of 20 g. of 3-benzal-phthalide and 16 g. of N,N-diethyl-ethylenediamine in 200 ml. of acetic acid is refluxed for three hours as described in Example 1 and the 2-(2-diethylaminoethyl)-3-benzal-phthalimidine isolated as its hydrochloride, M.P. 204–205°. Hydrogenation with hydrogen in the presence of platinum oxide gives the 2-(2-diethylaminoethyl)-3-benzyl-phthalimidine, isolated as the hydrochloride.

Example 6

Treatment of 3-benzal-phthalide with 2-morpholino-(N)-ethylamine according to the method given in Example 1 yields the 2-[2-morpholino-(N)-ethyl]-3-benzal-phthalimidine, the hydrochloride of which melts at 225–226°, which upon reduction with hydrogen in the presence of platinum oxide yields the 2-[2-morpholino-(N)-ethyl]-3-benzyl-phthalimidine, the hydrochloride of which melts at 198–200°.

Example 7

A mixture of 3-(3-methoxybenzal)-phthalide and N,N-dimethyl-ethylenediamine is reacted according to the procedure outlined in Example 1, and the thus-formed 2-(2-dimethylaminoethyl) - 3 - (3 - methoxybenzal) - phthalimidine, the hydrochloride of which melts at 46–48°, is treated with hydrogen in the presence of platinum oxide. The 2 - (2 - dimethylaminoethyl)-3-(3-methoxybenzyl)-phthalimidine is isolated as the hydrochloride, M.P. 124–126°.

The 3-(3-methoxybenzal)-phthalide used as the starting material may be prepared as follows: An intimate mixture of 100 g. of 3-methoxyphenylacetic acid, 74.5 g. of phthalic acid anhydride and 2 g. of anhydrous sodium acetate is heated slowly up to 230–240° in a manner allowing the water produced during the reaction to distill off. After cooling, the solid mass is triturated with a small amount of benzene and recrystallized from benzene to yield 3-(3-methoxybenzal)-phthalide of M.P. 114–115°.

Example 8

Treatment of 3-(3,4-dimethoxybenzal)-phthalide with N,N-dimethyl-ethylenediamine according to Example 1 yields the 2-(2-dimethylaminoethyl)-3-(3,4-dimethoxybenzal)-phthalimidine, M.P. 128–130°, the hydrochloride of which melts at 242–246°, and subsequent reduction with hydrogen in the presence of platinum oxide forms the 2-(2 - dimethylaminoethyl) - 3 - (3,4 - dimethoxybenzyl)-phthalimidine, isolated as the hydrochloride, M.P. 154–155°.

The 3-(3,4-dimethoxybenzal)-phthalide used as the starting material may be prepared as follows: An intimate mixture of 39 g. of 3,4-dimethoxyphenyl-acetic acid, 25 g. of phthalic anhydride and 0.65 g. of anhydrous sodium acetate is reacted as described in Example 7. The powdered precipitate is recrystallized from ethanol to give the 3-(3,4-dimethoxybenzal)-phthalide, M.P. 114–115°.

Example 9

Treatment of the 3-benzal-5(or 6)-chloro-phthalide with N,N-dimethyl-ethylenediamine according to Example 1 yields the 2-(2-dimethylaminoethyl)-3-benzal-5(or 6)-chloro-phthalimidine, the hydrochloride of which melts at 240–243°. Upon reduction with hydrogen in the presence of platinum oxide according to Example 1 the 2-(2-dimethylaminoethyl)-3-benzyl-5(or 6)-chloro-phthalimidine is formed, the hydrochloride of which melts at 175–176°.

The 3-benzal-5(or 6)-chloro-phthalide used as the starting material may be prepared as follows: An intimate mixture of 110 g. of phenylacetic acid, 125 g. of 4-chlorophthalic acid anhydride and 2.6 g. of anhydrous sodium acetate is reacted as described in Example 7. The two isomeric chloro substituted 3-benzal-phthalides which are formed in this reaction are separated by fractional crystallization from benzene. The 3-benzal-5(or 6)-chloro-phthalide, which after recrystallization melts at 175°, is used in the above reaction.

Example 10

3-phenyl-phthalide is refluxed with an excess of N,N-dimethyl-ethylenediamine for 48 hours. The reaction mixture is then diluted with water and the residual oil is extracted with ether. Upon evaporation of the ether the 2-(2-dimethylaminoethyl)-3-phenyl-phthalimidine of the formula:

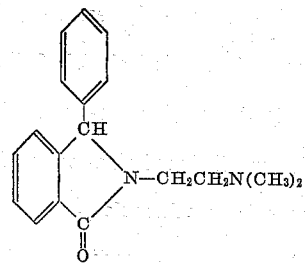

is isolated as the hydrochloride.

Example 11

By treating 3-(4-methylbenzal)-phthalide, M.P. 135–137°, with N,N-dimethyl-ethylenediamine according to Example 1 and reducing the resulting 2-(2-dimethylaminoethyl)-3-(4-methylbenzal)-phthalimidine, the hydrochloride of which melts at 228–229°, with hydrogen in the presence of platinum oxide. The 2-(2-dimethylaminoethyl)-3-(4-methyl-benzyl)-phthalimidine can be obtained, the hydrochloride of which melts at 188–189°. The starting material used in this reaction may be prepared by reacting 4-methyl-phenyl-acetic acid with phthalic acid anhydride in the presence of sodium acetate as previously described.

Example 12

A mixture of 4.1 g. of 3-benzal-6-nitro-phthalide and 2 g. of N,N-dimethyl-ethylenediamine is refluxed in the presence of acetic acid and the resulting 2-(2-dimethylaminoethyl)-3-benzal-6-nitro-phthalimidine, isolated as the hydrochloride, M.P. 265°, on reduction with hydrogen in the presence of platinum oxide yields the 2-(2-dimethylaminoethyl)-3-benzyl-6-amino-phthalimidine is obtained and characterized as the dihydrochloride, M.P. 200°.

Example 13

A mixture of 3-benzal-7-chloro-phthalide and N,N-dimethylethylenediamine is treated as described in Example 1 and the resulting 2-(2-dimethylaminoethyl)-3-benzal-7-chloro-phthalimidine, M.P. 98°, is reduced with hydrogen in the presence of platinum oxide to yield the 2 - (2 - dimethylaminoethyl) - 3 - benzal - 7 - chloro-phthalimidine, the hydrochloride of which melts at 280° after recrystallization from a mixture of ethanol and ether.

Example 14

A mixture of 3-benzal-4,5,6,7-tetrachloro-phthalide and N,N-dimethyl-1,3-propylenediamine is treated according to the procedure described in Example 4 and the resulting 2 - (3 - dimethylaminopropyl) - 3 - benzal - 4,5,6,7 - tetrachloro-phthalimidine, the hydrochloride of which melts at 300°, is hydrogenated in the presence of platinum oxide to yield the 2-(3-dimethylaminopropyl)-3-benzyl-4,5,6,7-tetrachloro-phthalimidine, which is recrystallized from a mixture of ethanol and water, M.P. 115–116°. The hydrochloride, recrystallized from a mixture of methanol and ether, melts at 155°.

Example 15

A mixture of 3-(3,4,5-trimethoxybenzal)-phthalide and N,N-diethyl-ethylenediamine is treated according to the procedure described in Example 1 and the resulting 2-(2-dimethylaminoethyl) - 3 - (3,4,5 - trimethoxybenzal)-phthalimidine, the hydrochloride of which melts at 275–276° after recrystallization from ethanol, is hydrogenated in the presence of platinum oxide to yield the 2-(2-dimethylaminoethyl) - 3 - (3,4,5-trimethoxybenzyl)-phthalimidine, the hydrochloride of which melts at 198° after recrystallization from ethanol.

Example 16

The 2-[2-pyrrolidino-(N)-ethyl]-3-benzyl-phthalimidine, the hydrochloride of which melts at 173–174° after recrystallization of a mixture of ethanol and ether, is prepared by treating a mixture of 3-benzal-phthalide with 2-pyrrolidino-(N)-ethylamine and hydrogenating in the presence of platinum oxide of the resulting 2-[2-pyrrolidino-(N)-ethyl]-3-benzal-phthalimidine, the hydrochloride of which melts at 248–250° after recrystallization from ethanol.

Example 17

The 3-(4-bromo-benzal)-phthalide may be condensed with N,N-dimethyl-ethylenediamine as described hereinabove and the resulting 2-(2-dimethylaminoethyl)-3-(4-bromo-benzal)-phthalimidine may be treated with hydrogen in the presence of platinum oxide to yield the 2 - (2 - dimethylaminoethyl) - 3 - (4 - bromo - benzyl)-phthalimidine, which may be characterized as the hydrochloride.

The 3-(4-bromo-benzal)-phthalide used as the starting material in the above reaction may be prepared by treating phthalic acid anhydride with 4-bromo-phenyl-acetic acid in the presence of sodium acetate as mentioned hereinbefore.

Example 18

A mixture of 3-(2-chloro-benzal)-phthalide and N,N-dimethyl-ethylenediamine is reacted according to the procedure described in Example 1 and the 2-(2-dimethylaminoethyl) - 3-(2-chloro-benzyl)-phthalimidine, melting at 105° after recrystallization from ether (hydrochloride M.P. 199–200° after recrystallization from a mixture of ethanol and ether), is obtained by hydrogenating the 2-(2 - dimethylaminoethyl)-3-(2-chloro-benzal)-phthalimidine, the hydrochloride of which melts at 158–159°, in the presence of platinum oxide.

Example 19

A mixture of 3-benzal-phthalide and 2-[N⁴-methyl-piperazino-(N¹)]-ethylamine is reacted according to the procedure outlined in Example 1 and the resulting 2-[2-N⁴ - methyl-piperazino - (N¹)-ethyl]-3-benzal-phthalimidine, the dihydrochloride of which melts at 275° after recrystallization from methanol, is hydrogenated in the presence of platinum oxide to the 2-[2-N⁴-methyl-piperazino-(N¹)-ethyl]-3-benzyl-phthalimidine, the dihydrochloride of which melts at 265° after recrystallization from methanol.

Example 20

A mixture of 3-benzalphthalide and 3-[N⁴-methyl-piperazino-(N¹)]-propylamine is treated as described in Example 1 and the resulting 2-[3-N⁴-methyl-piperazino-(N¹)-propyl]-3-benzal-phthalimidine, the dihydrochloride of which melts at 265–266° after recrystallization from ethanol, is hydrogenated in the presence of platinum oxide to yield the 2-[3-N⁴-methyl-piperazino-(N¹)-propyl]-3-benzyl-phthalimidine, the dihydrochloride of which melts at 240–241° after recrystallization from ethanol.

Example 21

The hydrochloride of 2-[3-morpholino-(N)-propyl]-3-benzyl-phthalimidine melts at 225° after recrystallization from ethanol, and is prepared by treating a mixture of 3-benzalphthalide with 3-morpholino-(N)-propylamine according to the procedure described in Example 1 and hydrogenating in the presence of platinum oxide the resulting 2 - [3 - morpholino-(N)-propyl]-3-benzalphthalimidine, the hydrochloride of which melts at 225° after recrystallization from ethanol.

The oxalate of the 2-[3-morpholino-(N)-ethyl]-3-benzyl-phthalimidine may be prepared by treating an ethanolic solution of the base, obtained from the hydrochloride by addition of aqueous ammonia and extraction of ether, with a concentrated ethanolic solution of oxalic acid.

Example 22

To a suspension of 5 g. of 3-benzalphthalide in 50 ml. of ethanol is added 2.5 ml. of N,N-dimethylethylenediamine and the mixture warmed for 5 minutes to complete the reaction. The ethanol is concentrated under reduced pressure to a small volume, water is added and the precipitate is filtered off. The resulting 2-phenylacetyl - benzoic acid N-(2-dimethylaminoethyl)-amide, M.P. 100°, is warmed in acetic acid, the cooled reaction mixture is made basic with aqueous ammonia, extracted with ether and the ether solution dried. After evaporation, the residue yields the 2-(2-dimethylaminoethyl)-3-benzal-phthalimidine, which is converted into the 2-(2-dimethylaminoethyl)-3-benzyl-phthalimidine, according to the procedure described in Example 1.

In addition to the above process the 2-tertiary aminoalkyl-phthalimidines, which contain in the 3-position an aryl or an aralkyl radical, as well as an aralkylidene radical, the salts and the quaternary ammonium compounds thereof may also be prepared according to the following methods.

For example, a phthalimidine, which contains in the 3-position an aryl, an aralkyl or an aralkylidene radical may be reacted with a reactive ester of a tertiary aminoalkanol to form the desired 2-tertiary aminoalkyl-phthalimidine. The phthalimidine is preferably used in the form of a metal salt, such as an alkali metal salt, e.g. sodium or potassium salt, which may be prepared by reacting the phthalimidine with an alkali metal, e.g. sodium or potassium; an alkali metal amide, e.g. sodium or potassium amide, or an alkali metal alkanolate, e.g. sodium or potassium methylate or ethylate. A reactive ester of a tertiary aminoalkanol is especially an ester with a strong inorganic or organic acid such as a hydrohalic acid, e.g. hydrogen chloride, hydrogen bromide or hydrogen iodide; sulfuric acid or p-toluene sulfonic acid. The starting material used in this reaction is known or may be prepared according to procedures analogous to those described in the prior art. Thus a phthalide, which contains in the 3-position an aryl, an aralkyl or an aralkylidene radical, may be reacted with ammonia to form the corresponding phthalimidine.

Furthermore, the 2-tertiary aminoalkyl-3-R-phthalimidines of this invention may also be prepared by reacting a reactive ester of a phthalimidino-(N)-alkanol which contains in the 3-position an aryl, an aralkyl or an aralkylidene radical, with a secondary amine. This reaction is preferably carried out in the presence of an acid binding agent such as potassium carbonate or sodium hydrogen carbonate. Reactive esters of such an alkanol are preferably those with a strong inorganic or organic acid, such as hydrohalic acids, e.g. hydrogen chloride, hydrogen bromide or hydrogen iodide, sulfuric acid or p-toluene sulfonic acid. A secondary amine is more especially an N,N-dihydrocarbon-substituted amine or an N,N-alkylene-imine; the radicals of such amines have already been described in detail for the definition of the tertiary amino group of the final products. The reactive ester of a phthalimidino-alkanol, which is used as starting material in this reaction may be prepared according to methods analogous to those known in the art.

What is claimed is:
1. 2-(2-dimethylaminoethyl)-3-benzyl-phthalimidine.
2. 2-(3-dimethylaminopropyl)-3-benzyl-phthalimidine.
3. 2-[2-pyrrolidino-(N)-ethyl]-3-benzyl-phthalimidine.
4. 2 - [3 - morpholino - (N) - propyl] - 3 - benzyl-phthalimidine.
5. 2 - [2 - N⁴ - methyl - piperazino - (N¹) - ethyl] - 3-benzyl-phthalimidine.
6. 2-(2-dimethylaminoethyl)-3-benzal-phthalimidine.
7. 2-(3-dimethylaminopropyl)-3-benzal-phthalimidine.
8. 2-[2-pyrrolidino-(N)-ethyl]-3-benzal-phthalimidine.
9. 2 - [3 - morpholino - (N) - propyl] - 3 - benzal-phthalimidine.
10. 2 - [2 - N⁴ - methyl - piperazino - (N¹) - propyl]-3-benzal phthalimidine.
11. 2-phenylacetyl-benzoic acid N-(2-dimethylaminoethyl)-amide.
12. 2-N,N-di-lower alkyl-amino-lower alkyl-3-benzyl-phthalimidine.
13. 2-N,N-lower alkylene-imino-lower alkyl-3-benzyl-phthalimidine.
14. A compound of the formula

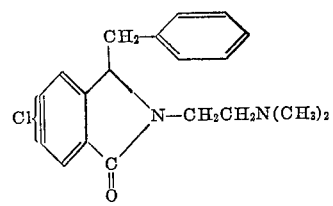

15. 2-N,N-di-lower alkyl-lower alkyl-3-benzal-phthalimidine.
16. 2-N,N-lower alkylene-imino-lower alkyl-3-benzal phthalimidine.
17. A compound of the formula

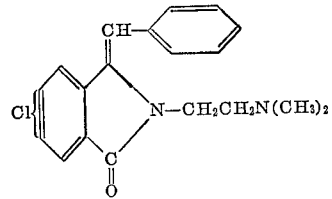

18. 2-(phenyl-acetyl)-benzoic acid N-(N,N-di-lower alkyl-amino-lower alkyl)-amide.
19. A member of the group consisting of 2-tertiary amino-lower alkyl-3-R-phthalimidine, in which R represents a member of the group consisting of phenyl, phenyl-lower alkyl and these radicals, in which the aromatic portion is substituted by lower alkyl, lower alkoxy and halogen, and tertiary amino represents a member of the group consisting of N,N-di-lower alkyl-amino, N,N-lower alkylene-imino, morpholino and N⁴-methyl-piperazino, and these compounds, in which the aromatic portion of the phthalimidine nucleus is substituted by a member of the group consisting of halogen and amino, and therapeutically useful acid addition salts and lower alkyl quaternary ammonium compounds thereof.
20. A member of the group consisting of 2-tertiary amino-lower alkyl-phthalimidine, which contains in the 3-position a substituent selected from the group consisting of phenyl-lower alkylidene and phenyl-lower alkylidene, in which the phenyl portion is substituted by lower alkyl, lower alkoxy and halogen, and tertiary amino represents a member of the group consisting of N,N-di-lower alkyl-amino, N,N-lower alkylene-imino, morpholino and N⁴-methyl-piperazino, and these compounds, in which the aromatic portion of the phthalimidine nucleus is substituted by a member of the group consisting of halogen and amino, and acid addition salts thereof.

References Cited in the file of this patent

UNITED STATES PATENTS 2,841,591  Prichard _____ July 1, 1958

OTHER REFERENCES

Rose: Chem. Abst., vol. 5, page 1738–1 (1911).
Pfeiffer: Chem. Abst., vol. 37, col. 4069–7 (1943).
Ohki: Chem. Abst., vol. 44, col. 5867h (1950).
Henze: Chem. Abst., vol. 46, col. 10147e (1952).
Pfeiffer: Chem. Abst., vol. 48, col. 12059 (1954).